United States Patent
Brewer et al.

(10) Patent No.: US 10,736,413 B2
(45) Date of Patent: Aug. 11, 2020

(54) SYSTEMS, DEVICES, AND METHODS OF A SELF-ACTIVATION USE ODOMETER FOR A SKIN CARE BRUSH

(71) Applicant: L'Oreal, Paris (FR)

(72) Inventors: Gerald Keith Brewer, Redmond, WA (US); Joel Timothy Aragon, Snohomish, WA (US); Aaron David Poole, Federal Way, WA (US); Robert E. Akridge, Seattle, WA (US)

(73) Assignee: L'Oreal, Paris (FR)

( * ) Notice: Subject to any disclaimer, the term of this patent is extended or adjusted under 35 U.S.C. 154(b) by 354 days.

(21) Appl. No.: 15/665,300

(22) Filed: Jul. 31, 2017

(65) Prior Publication Data

US 2019/0029411 A1 Jan. 31, 2019

(51) Int. Cl.
| | |
|---|---|
| *A46B 15/00* | (2006.01) |
| *A61H 7/00* | (2006.01) |
| *A61C 17/22* | (2006.01) |
| *A46B 13/02* | (2006.01) |
| *A46B 13/00* | (2006.01) |

(52) U.S. Cl.
CPC .......... *A46B 15/001* (2013.01); *A46B 13/008* (2013.01); *A46B 13/023* (2013.01); *A61C 17/221* (2013.01); *A61H 7/005* (2013.01); *A46B 2200/102* (2013.01); *A46B 2200/1006* (2013.01)

(58) Field of Classification Search
CPC .............. A46B 15/001; A46B 15/0004; A46B 15/0002; A46B 13/008; A46B 2200/006; A46B 2200/1006; A46B 2200/102; A61C 17/221
See application file for complete search history.

(56) References Cited

U.S. PATENT DOCUMENTS

| 3,103,679 A | 9/1963 | Clemens |
|---|---|---|
| 3,196,299 A | 7/1965 | Kott |
| 3,542,519 A | 11/1970 | Montalto et al. |
| (Continued) | | |

FOREIGN PATENT DOCUMENTS

| GB | 2 323 026 A | 9/1998 |
|---|---|---|
| JP | H1-185202 A | 7/1989 |
| (Continued) | | |

OTHER PUBLICATIONS

International Search Report and Written Opinion dated Oct. 17, 2018, issued in corresponding Application No. PCT/2018/044417, filed Jul. 30, 2018, 13 pages.

(Continued)

*Primary Examiner* — Orlando E Aviles
*Assistant Examiner* — Aaron R McConnell
(74) *Attorney, Agent, or Firm* — Christensen O'Connor Johnson Kindness PLLC

(57) ABSTRACT

A workpiece, such as a brush head, having a replacement indicator is provided, which is suitable for use with a personal care appliance. In use, the replacement indicator can provide an indication to the user recommending that the brush head be replaced after a duration has elapsed. The brush head includes a window to view the progress of the duration for recommended replacement and an indication when the duration has elapsed. In some embodiments, the duration is commenced when the brush head is initially installed on the personal care appliance.

18 Claims, 8 Drawing Sheets

(56) References Cited

U.S. PATENT DOCUMENTS

| | | |
|---|---|---|
| 3,605,347 A | 9/1971 | Barry |
| 4,014,064 A | 3/1977 | Okazaki |
| 4,161,050 A | 7/1979 | Sasaki et al. |
| 4,325,392 A | 4/1982 | Iten et al. |
| 4,475,261 A | 10/1984 | Okumura et al. |
| 4,722,111 A | 2/1988 | Brodey et al. |
| 4,802,255 A | 2/1989 | Breuer et al. |
| 5,062,209 A | 11/1991 | Rais |
| 5,313,909 A | 5/1994 | Tseng et al. |
| 5,322,031 A | 6/1994 | Lemer et al. |
| 5,388,331 A | 2/1995 | Siamak |
| 5,416,942 A | 5/1995 | Baldacci |
| 5,500,975 A | 3/1996 | Sano |
| 5,652,990 A | 8/1997 | Driesen et al. |
| 5,860,183 A | 1/1999 | Kam |
| 5,891,063 A | 4/1999 | Vigil |
| 5,906,834 A | 5/1999 | Tseng |
| 5,998,431 A | 12/1999 | Tseng et al. |
| 6,020,425 A | 2/2000 | Wang et al. |
| 6,058,541 A | 5/2000 | Masterman et al. |
| 6,295,733 B1 | 10/2001 | Wexler et al. |
| 6,373,786 B1 * | 4/2002 | Kagan ............... B65D 79/02 368/10 |
| 6,412,139 B1 | 7/2002 | Weihrauch |
| 6,482,511 B1 | 11/2002 | Martinez |
| 6,546,586 B2 | 4/2003 | Cho |
| 7,338,664 B2 | 3/2008 | Tseng et al. |
| 7,547,737 B2 | 6/2009 | Kochvar et al. |
| 8,448,286 B2 | 5/2013 | Driesen et al. |
| 2002/0049399 A1 | 4/2002 | Stampf |
| 2002/0088068 A1 | 7/2002 | Levy et al. |
| 2002/0138926 A1 | 10/2002 | Brown, Jr. et al. |
| 2003/0077107 A1 | 4/2003 | Kuo |
| 2004/0103492 A1 | 6/2004 | Kwon et al. |
| 2004/0134010 A1 | 7/2004 | Tseng et al. |
| 2005/0277950 A1 | 12/2005 | Pilcher et al. |
| 2006/0282963 A1 | 12/2006 | Brown, Jr. et al. |
| 2007/0101530 A1 | 5/2007 | Furumoto |
| 2007/0207440 A1 | 9/2007 | Chen et al. |
| 2008/0313835 A1 | 12/2008 | Russell et al. |
| 2009/0177125 A1 | 7/2009 | Pilcher et al. |
| 2010/0223745 A1 | 9/2010 | Kraemer et al. |
| 2012/0301210 A1 | 11/2012 | Sturgis et al. |
| 2013/0007969 A1 | 1/2013 | Driesen et al. |
| 2014/0082866 A1 | 3/2014 | Fischer et al. |
| 2014/0202493 A1 | 7/2014 | Zelickson et al. |
| 2015/0189980 A1 | 7/2015 | Hwang et al. |
| 2015/0359324 A1 * | 12/2015 | Brewer ............... A46B 15/001 15/22.1 |

FOREIGN PATENT DOCUMENTS

| | | |
|---|---|---|
| JP | H7-250711 A | 10/1995 |
| JP | H9-299148 A | 11/1997 |
| JP | H10-225324 A | 8/1998 |
| JP | 2000-279230 A | 10/2000 |
| JP | 2003-245131 A | 9/2003 |
| JP | 2009-240768 A | 10/2009 |
| WO | 93/03649 A1 | 3/1993 |
| WO | 01/56529 A2 | 8/2001 |
| WO | 2004/002267 A1 | 1/2004 |
| WO | 2005/092145 A2 | 10/2005 |
| WO | 2006/137028 A1 | 12/2006 |
| WO | 2009/084637 A1 | 7/2009 |
| WO | 2012/125370 A1 | 9/2012 |
| WO | 2013/191389 A1 | 12/2013 |

OTHER PUBLICATIONS

International Search Report dated Dec. 2, 2014, issued in corresponding International Application No. PCT/US2014/051538, filed Aug. 18, 2014, 3 pages.

Written Opinion dated Dec. 2, 2014, issued in corresponding International Application No. PCT/US2014/051538, filed Aug. 18, 2014, 6 pages.

International Search Report dated Sep. 10, 2015, issued in corresponding International Application No. PCT/US2015/035865, filed Jun. 15, 2015, 5 pages.

Written Opinion dated Sep. 10, 2015, issued in corresponding International Application No. PCT/US2015/035865, filed Jun. 15, 2015, 10 pages.

Notification of the First Office Action, dated Aug. 8, 2016, issued in corresponding Chinese Application No. 20140047869.X, filed Aug. 18, 2014, 20 pages.

Notification of the Second Office Action, dated Apr. 6, 2017, issued in corresponding Chinese Appliation No. 201480047869.X, filed Aug. 18, 2014, 13 pages.

* cited by examiner

SYSTEMS, DEVICES, AND METHODS OF A SELF-ACTIVATION USE ODOMETER FOR A SKIN CARE BRUSH

SUMMARY

In an aspect, the present disclosure is directed to, among other things, representative embodiments of a workpiece, such as a brush head, having a replacement indicator suitable for use with a personal care appliance. The replacement indicator generally provides an indication to the user recommending that the brush head be replaced after a duration has elapsed. The brush head includes a window viewable from the outer surface to view the progress of the duration for recommended replacement and an indication when the duration has elapsed. In some embodiments, the duration is commenced when the brush head is initially installed on the personal care appliance.

In accordance with aspects of the present disclosure, a skin brush head for use with a motorized personal appliance is provided. The skin brush head generally includes a body having an inner surface, an outer surface, and a window portion through which light transmits between the inner surface and the outer surface; a treatment applicator coupled to the outer surface of the body, wherein the treatment applicator may be configured to apply treatment to a skin portion; and a replacement indicator associated with the skin brush head, the replacement indicator configured to provide an indication through the window portion for recommending replacement of the skin brush head to a user after a duration of time the skin brush head is in use, wherein the duration of time may commence upon initial attachment of the skin brush head to the motorized personal care appliance.

In accordance with other aspects of the present disclosure, a skin brush head is provided. The skin brush head generally includes a body having a window portion; a plurality of bristles coupled to an outer surface of the body forming a central void adjacent the window portion, wherein the plurality of bristles may be configured to apply treatment to a skin portion; and a replacement indicator associated with the skin brush head, the replacement indicator configured to provide an indication through the window portion for recommending replacement of the skin brush head to a user after a duration of time the skin brush head is in use.

In accordance with any of the aspects disclosed herein, the window portion may be positioned within a void in the treatment applicator such that the window portion is visible by the user when viewed from the outer surface.

In accordance with any of the aspects disclosed herein, the replacement indicator may be configured to indicate when the duration of time has elapsed by spreading a dye.

In accordance with any of the aspects disclosed herein, the skin brush head may further include an activating member extending from the inner surface and configured to initiate spreading of the dye upon initial attachment of the skin brush head to the motorized personal appliance.

In accordance with any of the aspects disclosed herein, the dye may spread to a demarcation visible through the window portion when the duration of time has elapsed.

In accordance with any of the aspects disclosed herein, the duration of time to reach the demarcation may be between about thirty days and one hundred eighty days.

In accordance with any of the aspects disclosed herein, the duration of time to reach the demarcation may be between sixty days and one hundred twenty days.

In accordance with any of the aspects disclosed herein, the duration of time to reach the demarcation may be between eighty-five days and ninety-five days.

In accordance with any of the aspects disclosed herein, the replacement indicator may be disposed on the inner surface of the body.

In accordance with any of the aspects disclosed herein, the treatment applicator may include a plurality of bristles.

In accordance with any of the aspects disclosed herein, the body may be manufactured from a material of one or more of High-Density Polyethylene (HDPE), Low-Density Polyethylene (LDPE), Linear Low-Density Polyethylene (LLDPE), rubber, Polypropylene (PP), nylon, Acrylonitrile Butadiene Styrene (ABS), Polybutylene Terephthalate (PBT), HYTREL®, polyurethane, co-polyester, and other thermo plastic or polymer.

In accordance with any of the aspects disclosed herein, the skin brush head may further include an activating member extending from an inner surface and configured to initiate spreading of the dye upon initial attachment of the skin brush head.

In accordance with any of the aspects disclosed herein, the window portion may include a lens configured to magnify at least a portion of the replacement indicator.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The following discussion provides examples of devices that relate to skin care, and more particularly, to replaceable brush heads suitable for use with a personal care appliance for skin treatment of any exterior body part of a subject. Examples of the replaceable brush heads, or workpieces, include a replacement indicator, which can provide an indication to the user recommending that the brush head be replaced. In some examples herein, brush head replacement is recommended after about three (3) months of daily use, although other scheduled replacement protocols may be used.

In some examples, the replacement indicator can be integrated into the brush head such that the user has a visible cue that the scheduled replacement duration has elapsed. In this regard, the replacement indicator can be coupled to an inner surface of a body of the brush head with the visible cue portion of the replacement indicator positioned below a window within the body of the brush head. Replacement indicators can include a dye spreading/wicking type indicator where the dye spreads at a rate that corresponds to a duration for recommended replacement of the brush head. Conventional dye spreading indicators typically include a trigger mechanism, such as, for example, a dye-filled blister that initiates spreading of the dye when ruptured, and thereby commences the duration measurement. An example of such dye spreading replacement indicators includes Timestrip® (a brand of various products of Timestrip UK Ltd, Cambridge, United Kingdom), among other examples. In some embodiments, the trigger mechanism is automatically initiated upon the attachment of the brush head to the personal care appliance.

The aforementioned window is configured to allow light transmission between the surfaces of the brush head such that the user can observe the progress of the dye towards at least one demarcation indicating the specified duration has elapsed. The window is generally located within a void in the bristles of the brush head to be visible when a user looks toward the bristles of the brush head. In some embodiments, the window is formed from the material of the brush head body; however, in other embodiments the window is open and configured as an aperture to the replacement indicator.

Figure 1:
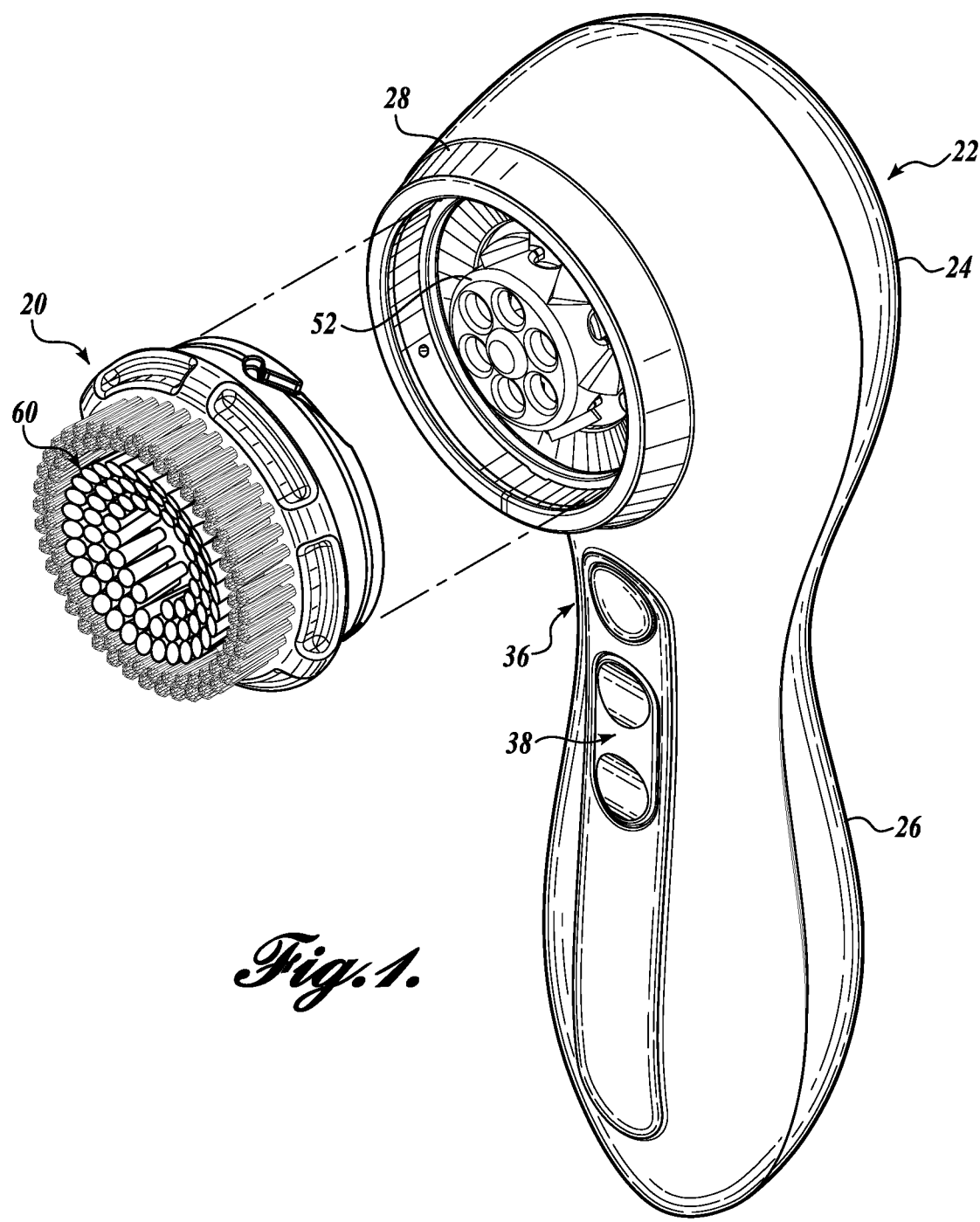
FIG. 1 is an isometric view of one example of a brush head in accordance with aspects of the present disclosure, showing the brush head exploded from a suitable personal care appliance.

Turning now to FIG. 1, there is shown one example of a workpiece, generally designated 20, formed in accordance with aspects of the present disclosure. The workpiece 20 is suitable for use with a personal care appliance, such as appliance 22. In the embodiment shown, the workpiece 20 is in the form of a skin brush head (hereinafter "brush head 20"). As will be described in more detail below, the brush head 20 includes a central assembly 60, which includes a window 92 that provides a visual cue to the user that recommends replacement of the brush head 20, as shown for example in FIGS. 6 and 7a-7d. In use, the central portion 60 can be rotated, reciprocated, oscillated, etc., by the personal care appliance 22 over a subject's skin in order to apply a treatment, e.g., cleanse, massage, exfoliate, etc., to the subject's skin.

Figure 2:
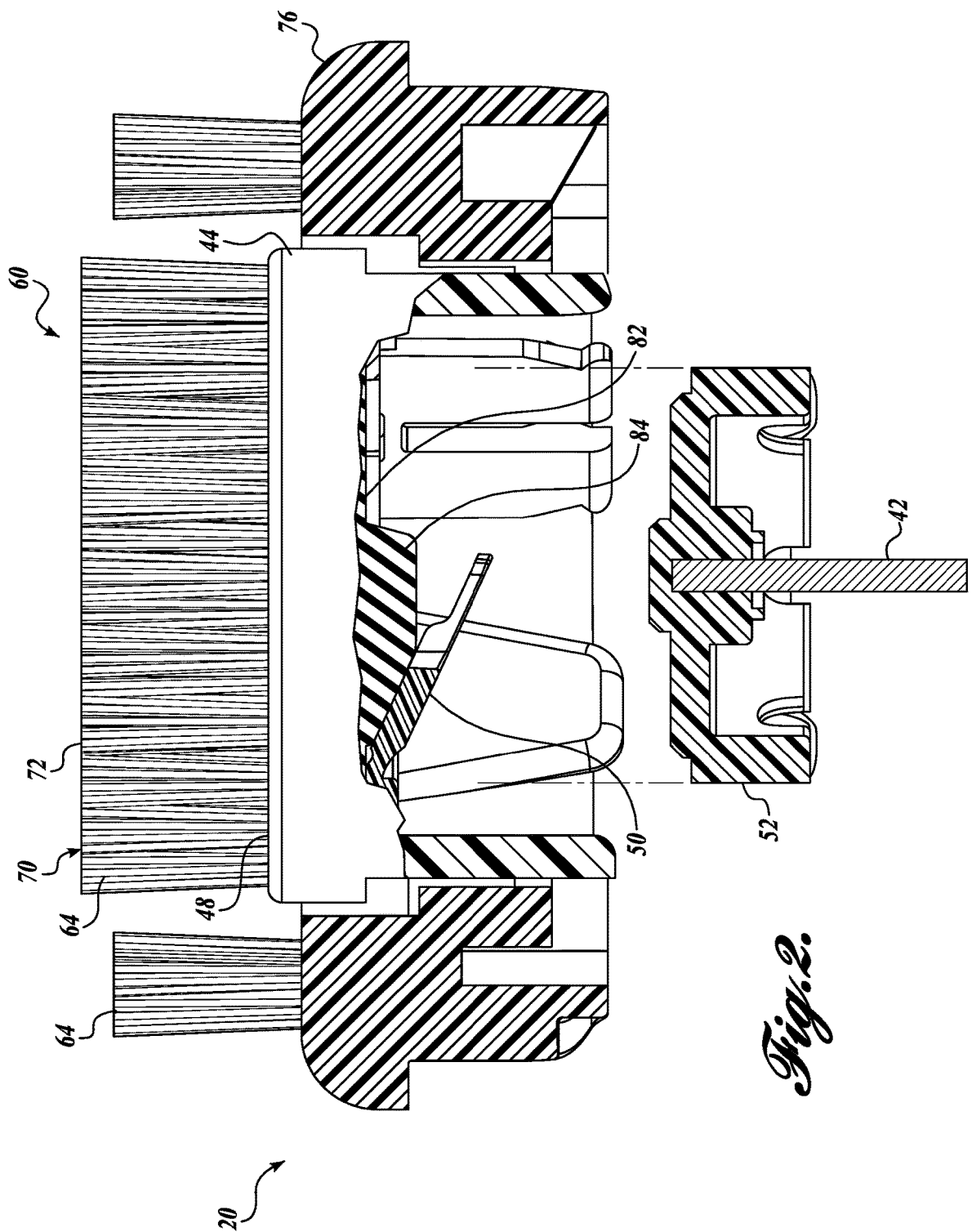
FIG. 2 is a cross sectional side view of the brush head of FIG. 1, showing the brush head exploded from a drive boss of the personal care appliance with an activating member in an initial first position.
Figure 3:
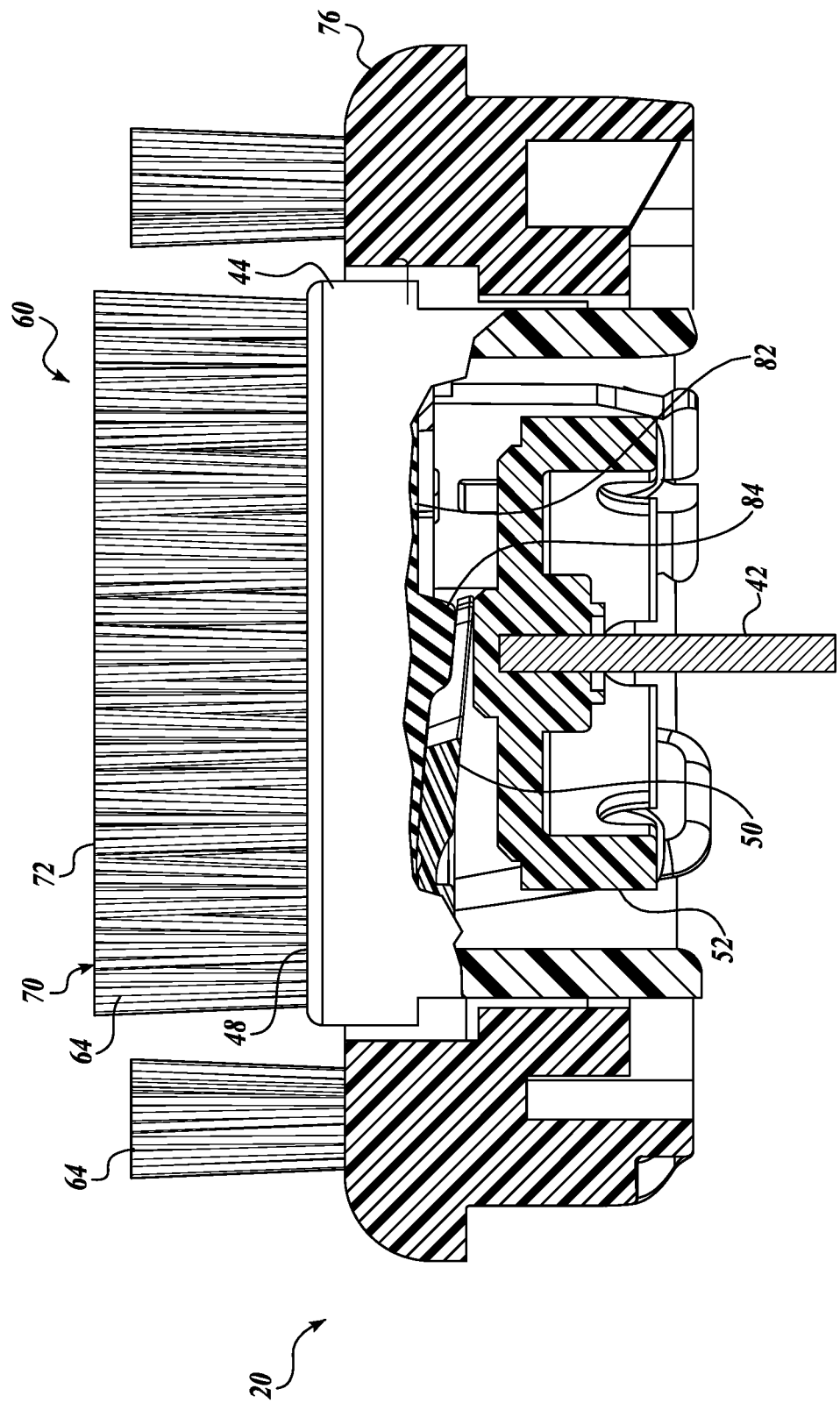
FIG. 3 is a cross sectional side view of the brush head of FIG. 1, showing the brush head installed on the drive boss of the personal care appliance with the activating member in a second position to commence the duration measurement.

Turning now to FIGS. 1-3, one example of the brush head 20 will be described in more detail. As shown in FIG. 2, the brush head 20 includes a central assembly 60 with a body 44 having an outwardly facing outer surface 48. In the embodiment shown, the body 44 has a generally cylindrical cross-section, although other geometrical cross-sections (i.e. triangular, elliptical, lobular, square, etc.) may be employed. The body 44 can be constructed out of plastic, such as High-Density Polyethylene (HDPE), Low-Density Polyethylene (LDPE), Linear Low-Density Polyethylene (LLDPE), rubber, Polypropylene (PP), nylon, Acrylonitrile Butadiene Styrene (ABS), Polybutylene Terephthalate (PBT), HYTREL®, polyurethane, co-polyester, etc., although other materials may be utilized, including lightweight metals, such as aluminum, titanium, etc. As will be described in more detail below, the body 44 can be configured to interface directly or indirectly with a component, such as for example a drive boss 52 of the personal care appliance 22.

The central assembly 60 includes a treatment applicator coupled to outer surface 48 of the body 44 and extending outwardly therefrom. In some embodiments, the treatment applicator is in the form of, for example, a plurality of bristles 64, as shown in FIG. 2. The plurality of bristles 64 can be spaced apart, or in the embodiment shown in FIG. 1, the plurality of bristles 64 can be grouped together (e.g., 20-180 bristle groupings) to form one or more tufts 70. In either case, the bristles 64 extend upwardly from the outer surface 48 of the body 44 and terminate as bristle tips 72. The bristles 64 in some embodiments of the present disclosure have a length of about 0.20 inches (5.08 millimeters) to about 1.2 inches (30.48 millimeters) or greater and a diameter in the range of about 0.002 inches (0.0508 millimeters) to about 0.020 inches (0.508 millimeters) or greater. In some embodiments, one group of bristles can have a longer length than another group of bristles. One example of a brush head with bristles of varying lengths is described in U.S. Pat. No. 9,107,486, filed Apr. 12, 2013. The bristles 64 can be constructed out of a variety of materials, including but not limited to elastomers, co-elastomers, polymers, co-polymers, and blends or combinations thereof, etc. Although the illustrated embodiments of the central assembly 60 in FIGS. 1, 5a, 5b, 6, and 7a-7d shows single larger bristles attached to the central assembly, it is intended that each bristle 64 shown represents a tuft 70 and can be divided into any number of a plurality of bristles 64 as generally shown in FIGS. 2 and 3.

In some embodiments, one or more of the bristles 64 may be constructed out of polybutylene terephthalate (PBT) polyester or a TPE/PBT blend, such as DuPont™ Tynex®, Supersoft Hytrel® thermoplastic elastomer filaments or DuPont™ Natrafil® polyester with texturing additives with high performance suitable for sonic applications. In other embodiments, the bristles can be constructed out of or include an elastomer. One such example includes an elastomeric (e.g., TPE) inner core and a polymer (e.g., PBT) outer jacket. Although DuPont materials are mentioned herein with their trade names, it is understood that generic equivalents and variations may be suitable for use also, such as; polypropylene, polyethylene, such as DuPont™ Bynel®, with combinations or blends thereof, etc.

In some embodiments, the bristles 64 may have cross sections including but not limited to solid round, hollow, rectangular, diamond, hollow, rectangular, X-shape, quadralobal, including textured surface etc. Additives may be added that can either enhance sonic resonance characteristics, or provide extra benefits such as silver zeolite for antibacterial effects. Additives may also be used to modify the surface energy of the filaments and control the surface energy, as will be described in more detail below.

Still referring to FIG. 2, the brush head 20 in some embodiments may also include an optional outer retainer 76.

The outer retainer 76 forms a central, cylindrically shaped opening that is sized and configured to surround the central assembly 60. In some embodiments, a plurality of bristles 64 extend from the outer surface of the outer retainer 76. In yet other embodiments the retainer 76 may be absent of bristles (e.g., filaments) and have a more decorative design. The body 44 and the outer retainer 76 together include an attachment system in some embodiments that is configured to provide selective attachment of the brush head 20 to the personal care appliance 22.

Figure 4:
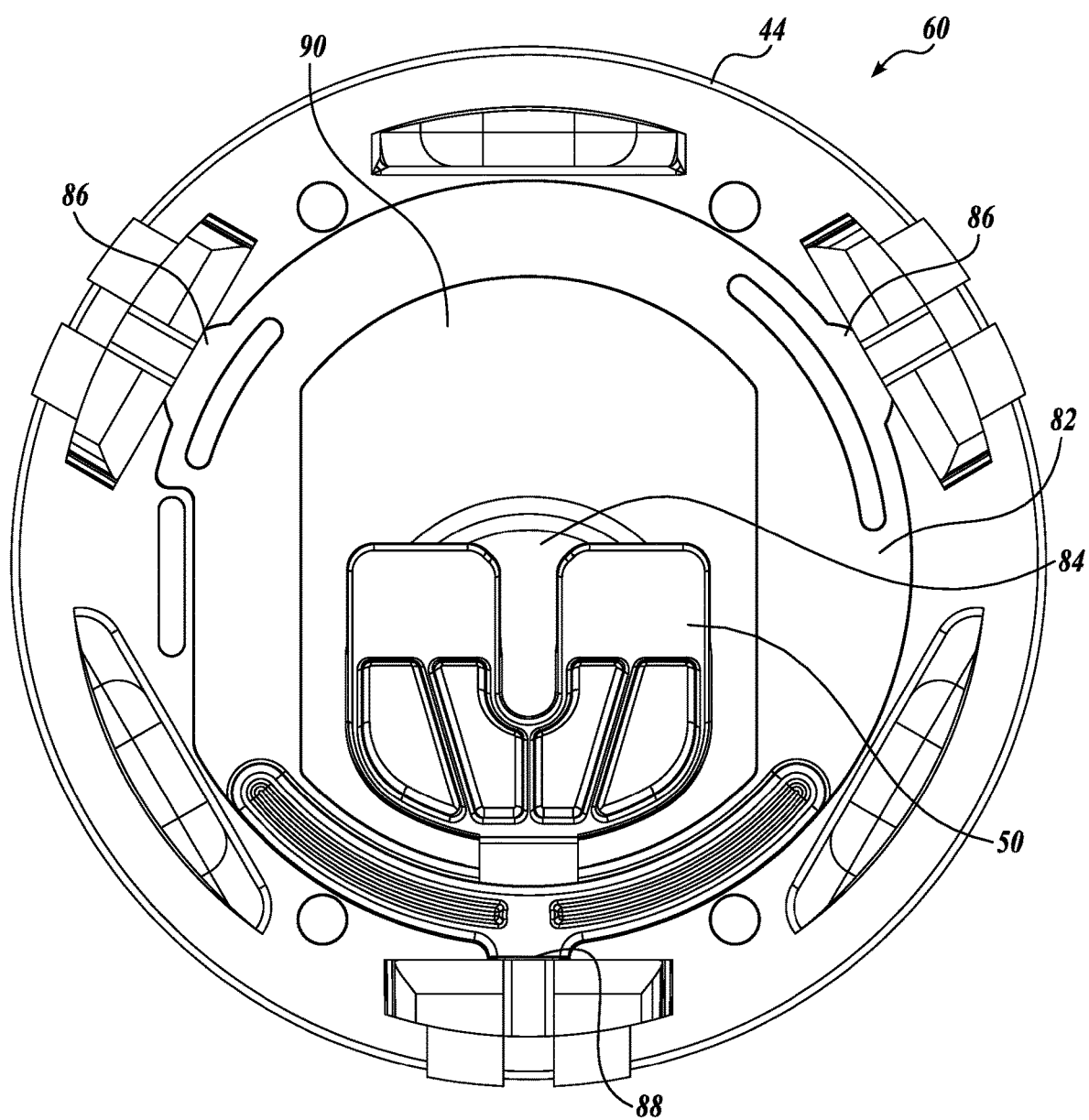
FIG. 4 is a bottom view of a central assembly of the brush head of FIG. 1, the brush head having one example of a replacement indicator in accordance with aspects of the present disclosure.
Figure 5A:
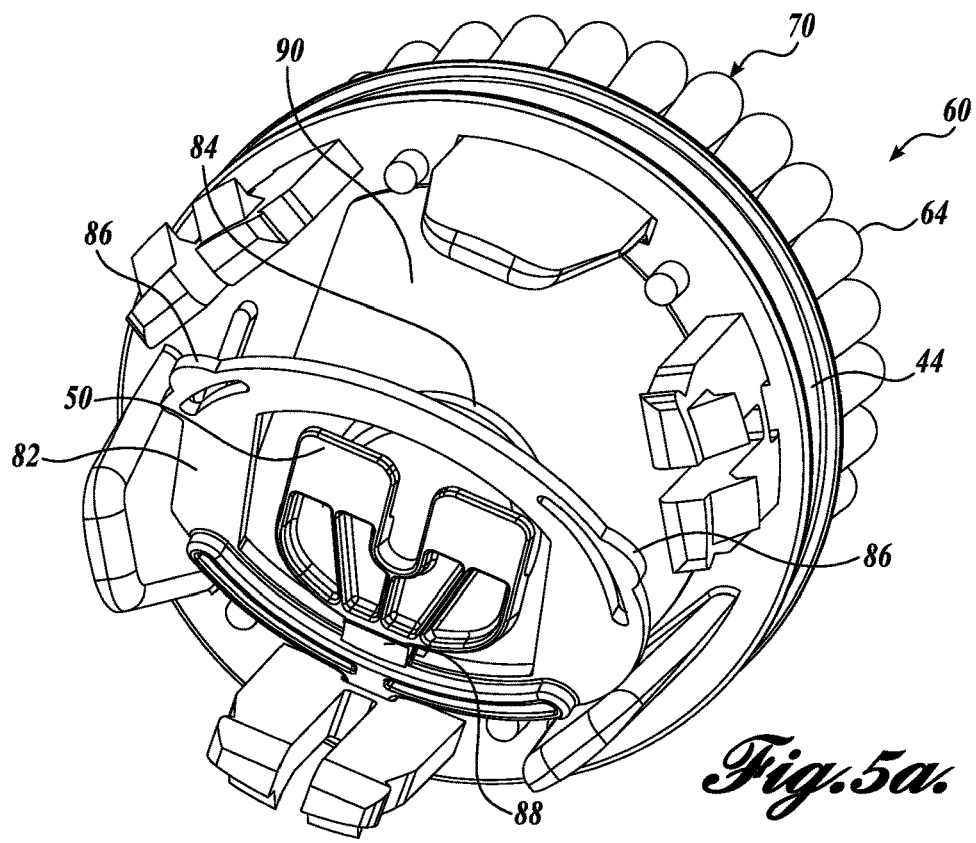
FIG. 5a is a bottom side isometric view of the central assembly of FIG. 4, showing a retention door in an open position.
Figure 5B:
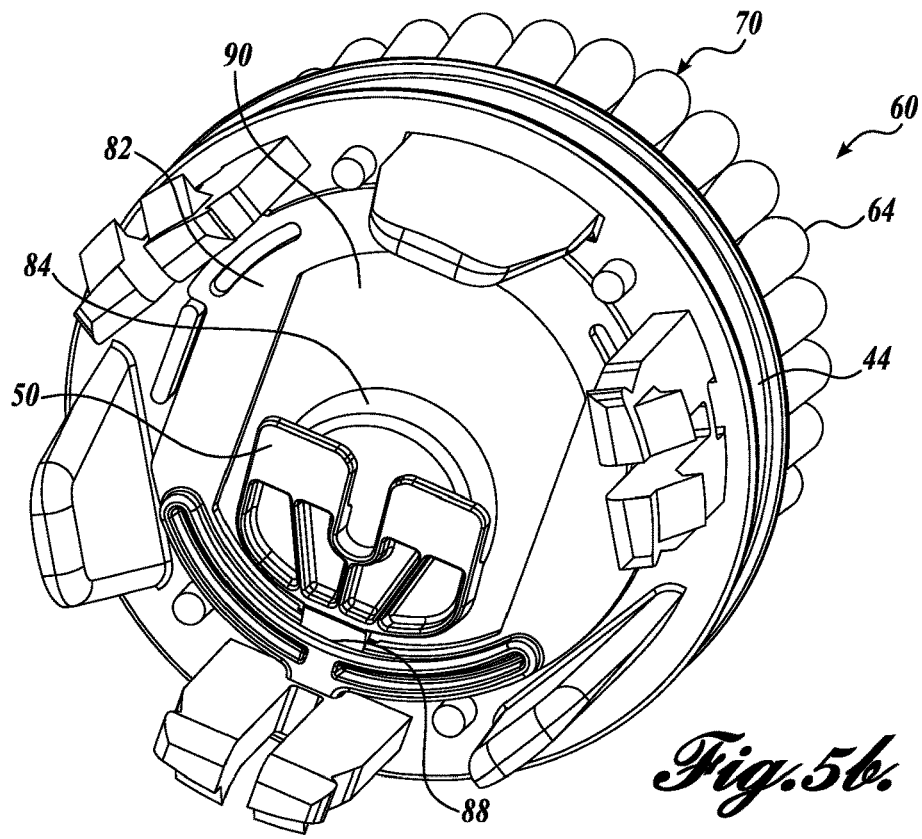
FIG. 5b is a bottom side isometric view of the central assembly of FIG. 4, showing the retention door in a closed position.
Figure 6:
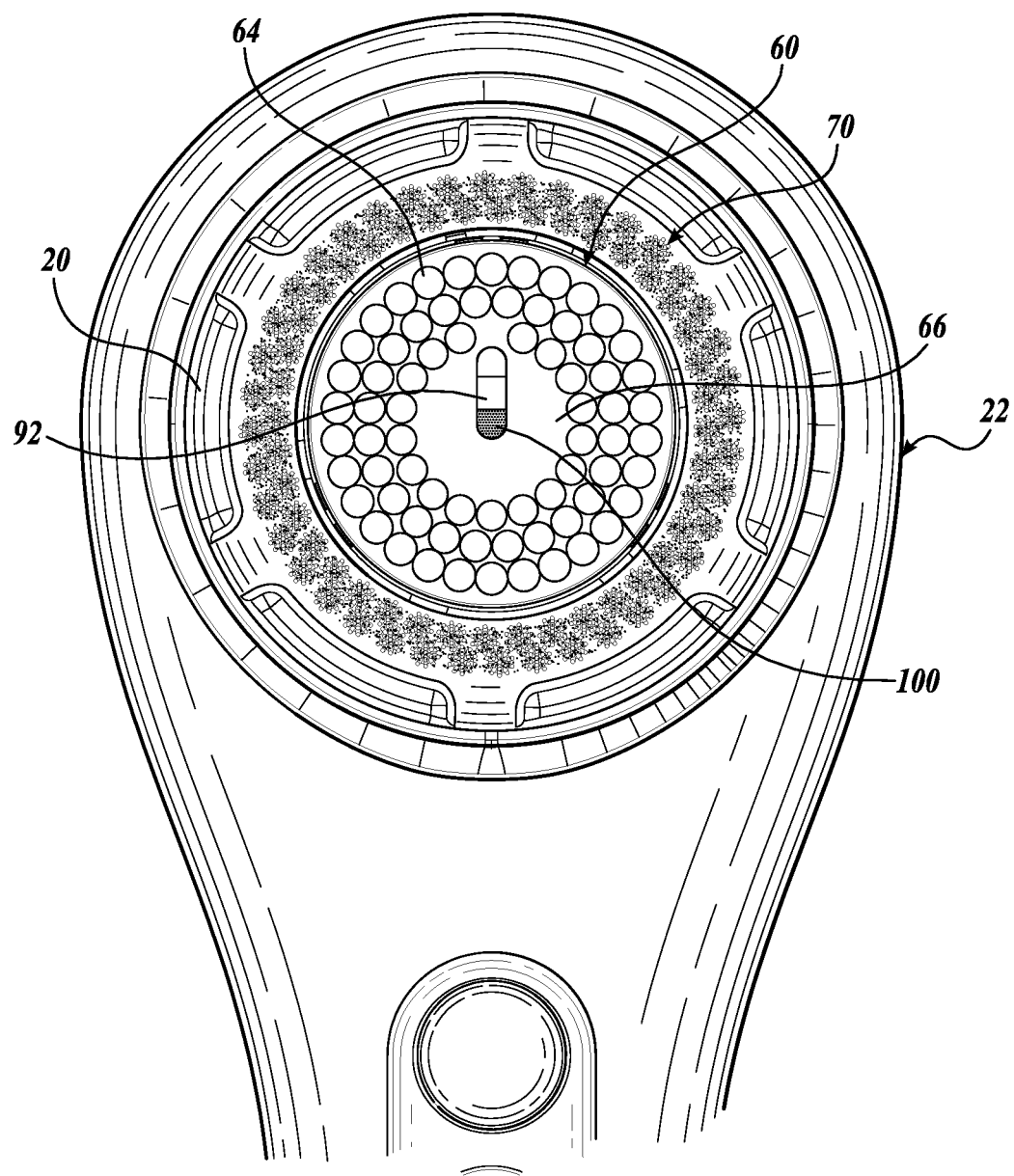
FIG. 6 is a top view of a brush head coupled to a personal care appliance, the brush head having an example of a replacement indicator window in accordance with aspects of the present disclosure.

As briefly described above, the brush head 20 further includes a replacement indicator 90, as generally shown coupled to an inner surface of the central assembly 60 in FIGS. 4 and 5a-5b. In the embodiment shown in the FIGURES, the replacement indicator 90 includes a dye 100 that spreads and/or wicks along the replacement indicator 90 (see, for example, the transition from FIG. 7a through FIG. 7d, showing the spreading of the dye 100 within the window 92) to give the user a visual indication of the time duration since the brush head 20 was initially attached to the personal care appliance 22. In embodiments, the dye 100 can be any color, black, or white, depending on the aesthetic requirements of the brush head 20.

Turning now to FIGS. 5a and 5b, the replacement indicator 90 is shown retained to the inner surface of the central assembly 60 by an articulating door 82 having a hinge 88 and retention tabs 86 configured to secure the articulating door 82 in a closed position as shown in FIG. 5b. To insert the replacement indicator 90, the articulating door 82 is released at the retention tab 86 and pulled away from the central assembly 60, articulating on the hinge 88. FIG. 5a shows the articulating door 82 in an open position with the replacement indicator 90 installed. Once the replacement indicator 90 is in position with the inner surface of the central assembly 60, the articulating door 82 is secured to the inner surface using the retention tabs 86. In the illustrated embodiment, two retention tabs 86 are shown; however, in other embodiments, any number of retention tabs 86 are positioned to secure the articulating door 82. In some embodiments, the articulating door 82 is removable from the central assembly 60. In other embodiments, the replacement indicator 90 is secured to the central assembly 60 using any suitable securement configuration, for example, with adhesive, fasteners, magnets, mechanical locking, dual lock, etc.

Returning to FIGS. 2 and 3, in some embodiments, the attachment of the brush head 20 onto the drive boss 52 of the personal care appliance 22 initiates the spreading of the dye 100 in the replacement indicator 90. The articulating door 82 includes an activating member 50 positioned such that the drive boss 52 abuts the activating member 50 upon attachment of the brush head 20 to the personal care appliance 22. In this regard, the activating member 50 is rotated by the abutment of the drive boss 52 such that the activating member 50 interfaces a duration initiation mechanism 84 of the replacement indicator 90. In the illustrated embodiments, the duration initiation mechanism 84 is a dye-filled blister (hereinafter "blister 84") configured to burst and release dye 100 within the replacement indicator 90 upon attachment of the brush head 20 to the personal care appliance 22. As the activating member 50 is rotated to exert a force on the blister 84, increasing pressure of dye 100 within the blister 84 ruptures a membrane (not shown) to release dye 100 into the replacement indicator 90 and commence the measurement of the duration for replacement of the brush head 20. In the embodiments with a replacement indicator 90 having a blister 84, measurement of the duration for replacement cannot be paused or suspended. In other embodiments, the replacement indicator 90 pauses the measurement of the duration upon removal of the brush head 20 from the personal care appliance 22.

Turning now to FIGS. 6 and 7a-7d, the window 92 will now be described in greater detail. The window 92 is located in the central assembly 60 within the body 44. The window 92 is configured to allow light to transmit between the inner and outer surface of the central assembly 60 such that the user can view the dye 100 within the replacement indicator 90 on the inner surface of the central assembly 60. In these embodiments, the window 92 additionally provides protection to the replacement indicator 90 such that treatment formulation and/or contaminants from the skin do not contact the replacement indicator 90 during use. In other embodiments, the window 92 is open (i.e., an aperture) such that the replacement indicator 90 is directly viewed by the user through the opening. In further embodiments, the window 92 has a concave or convex lens configuration such that the replacement indicator 90 is magnified, for example, so the progress of the dye 100 is visible to a user with diminished eyesight, or contracted. In these regards, the lens shape may amplify or concentrate the dye 100 of the replacement indicator 90.

As shown, the window 92 is positioned such that the dye 100 is visible by the user. In this regard, a void 66 in the bristles 64 is positioned on the upper surface 48 the central assembly 60 such that the window 92 is viewable by the user. In some embodiments, the void 66 may be substantially circular; however, in other embodiments, the void 66 is any suitable shape to allow viewing of the window 92 by the user. In other embodiments, the void 66 may be created by tilting the bristles 64 away from the window 92. In these embodiments, the bristles 64 may be tilted by 5 degrees or more.

FIGS. 7a through 7d show a transition of the dye 100 within the replacement indicator 90 to indicate the progress of the measurement of the duration the brush head 20 has been installed on the personal care appliance 22. In some embodiments, the replacement indicator may have first and second demarcations 94 and 96 to indicate partial durations for replacement, for example, one-month and two-months, respectively. The first and second demarcations 94 and 96 may be suitably placed on a surface of the window 92 or on the replacement indicator 90. Indicators supplied by Timestrip®, as detailed above, generally include demarcations on the replacement indicator 90. Prior to initial installation, the dye 100 is located in the blister 84 until the blister 84 is ruptured by the activating member 50 during initial attachment of the brush head 20 to the personal care appliance 22.

Figure 7A:
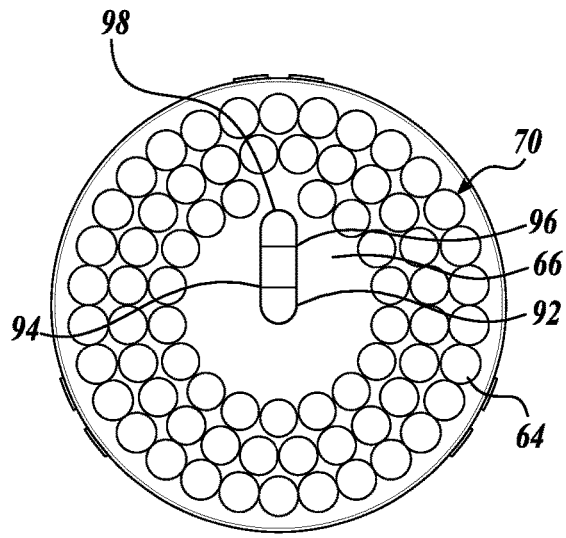
FIGS. 7a-7d are top views of a central assembly of the brush head of FIG. 6, showing various progress of dye within the replacement indicator over a time duration to indicate when the brush head is in need of replacement.
Figure 7B:
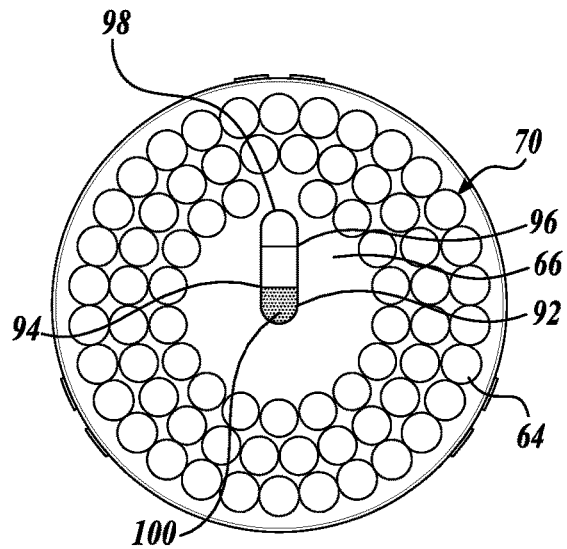
Figure 7C:
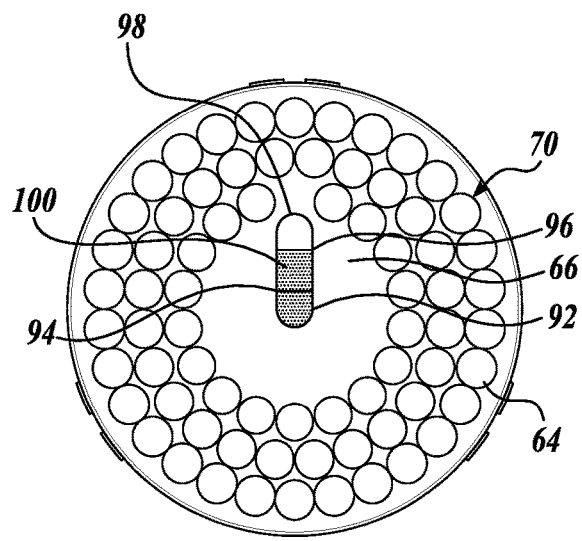
Figure 7D:
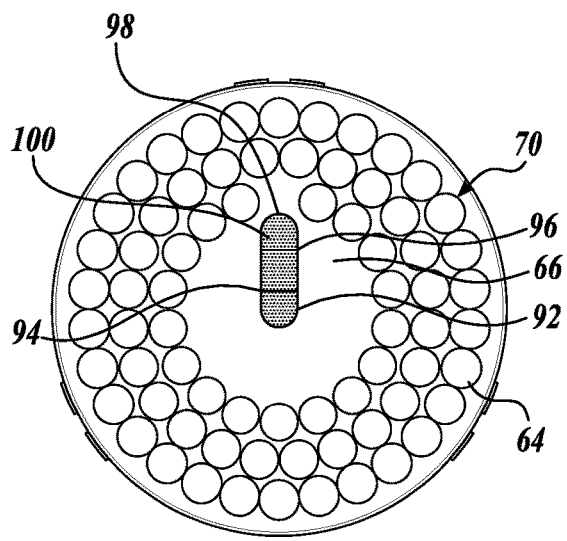

FIG. 7a shows the replacement indicator 90 configuration through the window 92 at an initial condition, where the dye 100 is not yet visible within the window 92. FIG. 7b shows the replacement indicator 90 configuration through the window 92 at a first intermediate condition, where the dye 100 is visible within the window 92 to the first demarcation 94. FIG. 7c shows the replacement indicator 90 configuration through the window 92 at a second intermediate condition, where the dye 100 is visible within the window 92 to the second demarcation 94. FIG. 7d shows the replacement indicator 90 configuration through the window 92 at a final condition, where the dye 100 is visible within the window 92 to an elapsed duration end 98 of the window 92. In some embodiments, as the replacement indicator 90 is put into position below the articulating door 82, a clocking feature (not shown) may be located on the inner surface of the central assembly 60 to orient the replacement indicator 90 in the correct position for visual indication of the time duration through the window 92.

In the illustrated embodiments, the window 92 is shown as an oblong shape; however, the window can be any suitable shape to indicate the duration the brush head 20 has been attached to the personal care appliance 22. In other embodiments, the window 92 is suitably tear-drop shaped, polygonal shaped, curvilinear, etc. In some embodiments, multiple windows 92 may be included to indicate various stages of the duration measurement. In this regard, a single window may be included to indicate each intermediate duration and the final elapsed duration. Likewise, the window 92 may be in the form of or include a symbol or words indicating a need for brush head replacement. In the embodiment shown, the elapsed duration end 98 can be configured to depict, for example, a universal symbol to replace the brush head. In another embodiment, window 92 may spell out a word, such as for example "REPLACE," as an instructional message to the user.

In general, embodiments of the brush head 20 are recommended to be replaced after about three (3) months of daily use. However, in other embodiments, any suitable duration for replacement is within the scope of the present disclosure. For example, in some embodiments, the dye 100 in replacement indicator 90 is configured to reach the replacement point 98 in a duration of between about thirty days and one hundred eighty days. In another embodiment, the dye 100 in replacement indicator 90 is configured to reach the replacement point 98 in a duration of between about sixty days and one hundred twenty days. In a further embodiment, the dye 100 in replacement indicator 90 is configured to reach the replacement point 98 in a duration of between about eighty-five days and ninety-five days.

As stated above, examples of the brush head 20 are suitable for use with a personal care appliance. In that regard, one example of a personal care appliance 22 that may be employed to impart an oscillating motion to the brush head 20 will be described in some detail. While the personal care appliance 22 is one type of appliance that can be practiced with embodiments of the present disclosure, it will be appreciated that the brush head 20 is suitable for use with a wide range of oscillatory, rotational, and reciprocating motion generating devices.

Figure 8:
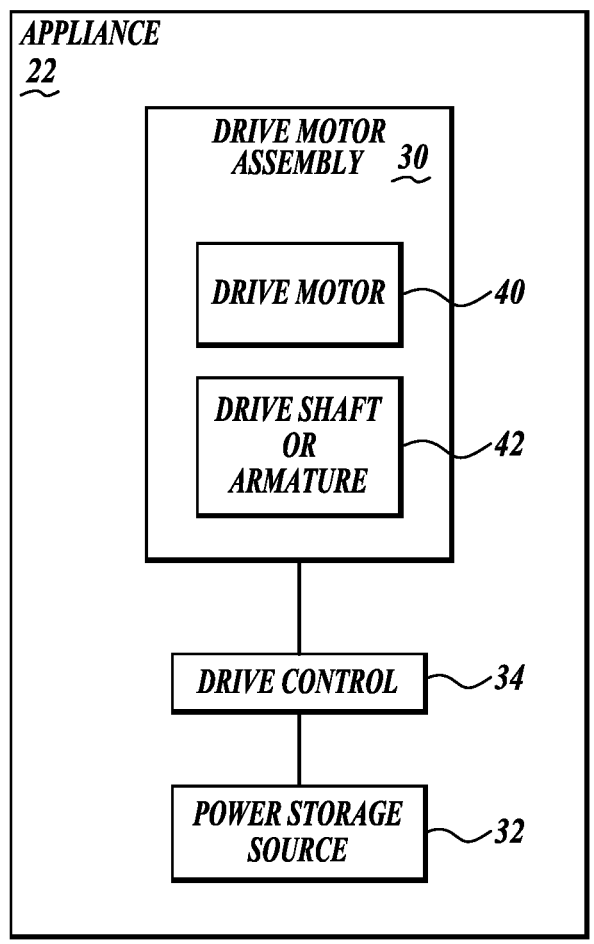
FIG. 8 illustrates in block diagrammatic form one example of the personal care appliance.

Turning now to FIGS. 1, 2, and 8, there is shown one example of the personal care appliance 22. The appliance 22 includes a body 24 having a handle portion 26 and a head attachment portion 28. The head attachment portion 28 is configured to selectively attach a workpiece or head, such as brush head 20, to the appliance 22. The appliance body 24 houses the operating structure of the appliance. As shown in block diagrammatic form in FIG. 8, the operating structure in one embodiment includes a drive motor assembly 30, a power storage source 32, such as a rechargeable battery, and a drive control 34 that includes an on/off button 36 (See FIG. 1) configured and arranged to selectively deliver power from the power storage source 32 to the drive motor assembly 30. In some embodiments, the drive control 34 may also include a power adjust or mode control buttons 38 (See FIG. 1) coupled to control circuitry, such as a programmed microcontroller or processor, which is configured to control the delivery of power to the drive motor assembly 30. The drive motor assembly 30 in some embodiments includes an electric drive motor 40 that drives the brush head 20, via a drive shaft or armature 42 and drive boss 52.

When the brush head 20 is mounted to the head attachment portion 28, the drive motor assembly 30 is configured to impart motion to the brush head 20. The drive motor assembly 30 may be configured to operate the brush head 20 at sonic frequencies, typically in the range of 40-350 Hz, oscillating the brush head 20 back and forth within a range or amplitude of 3-45 degrees. In some embodiments, the brush head 20 can be operated in loaded or unloaded conditions at frequencies from about 80 Hz to about 220 Hz and with a range or amplitude of about 6 degrees to about 20 degrees. It will be appreciated that the operation frequency and oscillation amplitude imparted to the cleansing workpiece 20 by the drive motor assembly 30 could be varied, depending in part on its intended application and/or characteristics of the brush head, such as its inertial properties, etc.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "back," "upward," "downward," "right hand," "left hand," "lateral," "medial," "in," "out," "extended," "advanced," "retracted," "proximal," "distal," "central," etc. These references, and other similar references in the present application, are only to assist in helping describe and understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A skin brush head for use with a motorized personal appliance, comprising: a body having an inner surface, an outer surface, and a window portion through which light transmits between the inner surface and the outer surface; a treatment applicator coupled to the outer surface of the body, wherein the treatment applicator is configured to apply treatment to a skin portion; and a replacement indicator associated with the skin brush head, the replacement indicator configured to provide an indication through the window portion for recommending replacement of the skin brush head to a user after a duration of time the skin brush head is in use, wherein the duration of time commences upon initial attachment of the skin brush head to the motorized personal appliance; wherein the replacement indicator is configured to indicate when the duration of time has elapsed by spreading a dye.

2. The skin brush head of claim 1, wherein the window portion is positioned within a void in the treatment applicator such that the window portion is visible by the user when viewed from the outer surface.

3. The skin brush head of claim 1, further comprising an activating member extending from the inner surface and configured to initiate spreading of the dye upon initial attachment of the skin brush head to the motorized personal appliance.

4. The skin brush head of claim 1, wherein the dye spreads to a demarcation visible through the window portion when the duration of time has elapsed.

5. The skin brush head of claim 4, wherein the duration of time to reach the demarcation is between about thirty days and one hundred eighty days.

6. The skin brush head of claim 4, wherein the duration of time to reach the demarcation is between sixty days and one hundred twenty days.

7. The skin brush head of claim 4, wherein the duration of time to reach the demarcation is between eighty-five days and ninety-five days.

8. The skin brush head of claim 1, wherein the replacement indicator is disposed on the inner surface of the body.

9. The skin brush head of claim 1, wherein the treatment applicator includes a plurality of bristles.

10. The skin brush head of claim 1, wherein the body is manufactured from a material of one or more of High-Density Polyethylene (HDPE), Low-Density Polyethylene (LDPE), Linear Low-Density Polyethylene (LLDPE), rubber, Polypropylene (PP), nylon, Acrylonitrile Butadiene Styrene (ABS), Polybutylene Terephthalate (PBT), HYTREL®, polyurethane, co-polyester, and other thermo plastic or polymer.

11. A skin brush head, comprising: a body having a window portion; a plurality of bristles coupled to an outer surface of the body forming a central void adjacent the window portion, wherein the plurality of bristles are configured to apply treatment to a skin portion; a replacement indicator associated with the skin brush head, the replacement indicator configured to provide an indication through the window portion for recommending replacement of the skin brush head to a user after a duration of time the skin brush head is in use; and an activating member extending from an inner surface of the body, the activating member configured to initiate the duration of time upon initial attachment of the skin brush head to a personal appliance; wherein the replacement indicator is configured to indicate when the duration of time has elapsed by spreading a dye.

12. The skin brush head of claim 11, wherein the activating member is configured to initiate spreading of the dye upon initial attachment of the skin brush head.

13. The skin brush head of claim 11, wherein the dye spreads to a demarcation visible through the window portion when the duration of time has elapsed.

14. The skin brush head of claim 13, wherein the duration of time to reach the demarcation is between about thirty days and one hundred eighty days.

15. The skin brush head of claim 13, wherein the duration of time to reach the demarcation is between sixty days and one hundred twenty days.

16. The skin brush head of claim 13, wherein the duration of time to reach the demarcation is between eighty-five days and ninety-five days.

17. The skin brush head of claim 11, wherein the window portion includes a lens configured to magnify at least a portion of the replacement indicator.

18. The skin brush head of claim 11, wherein the body is manufactured from a material of one or more of High-Density Polyethylene (HDPE), Low-Density Polyethylene (LDPE), Linear Low-Density Polyethylene (LLDPE), rubber, Polypropylene (PP), nylon, Acrylonitrile Butadiene Styrene (ABS), Polybutylene Terephthalate (PBT), HYTREL®, polyurethane, co-polyester, and other thermo plastic or polymer.

* * * * *